United States Patent Office 3,408,395
Patented Oct. 29, 1968

3,408,395
PREPARATION OF ALKYLAMINODIBORANE
COMPOUNDS
Albert Khuri, South Charleston, W. Va., assignor to Union
Carbide Corporation, a corporation of New York
No Drawing. Filed Apr. 7, 1966, Ser. No. 540,838
8 Claims. (Cl. 260—551)

ABSTRACT OF THE DISCLOSURE

Process for producing alkylaminodiboranes of the formula

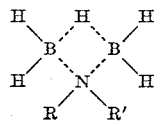

wherein R is alkyl and R' is hydrogen or alkyl, are prepared by reacting certain metal borohydrides with tetra(mono- or dialkyl-amino) diboron compounds. The alkylaminodiboranes are useful as rocket fuels and as components in rocket fuels.

---

The present invention relates to a novel process for the preparation of alkylaminodiborane compounds. More particularly, the invention is concerned with a process for preparing alkylaminodiborane compounds by the reaction of a covalent metal borohydride with a tetra(alkylamino)diboron compound.

The alkylaminodiboranes are known compounds which are useful as rocket fuels and as components in rocket fuels. Several methods are known for producing these compounds but each method has required the use of elevated temperatures which are undesirable when dealing with such readily combustible materials. For example, diborane is known to react with dimethylaminoborane at a temperature of about 135° C. to produce dimethylaminodiborane. Another known method involves the reaction of diborane with bis (or tris) dimethylaminoborane at about 100° C. Still another known process for producing the alkylaminodiboranes involves the reaction of diborane with alkylamineboranes at a temperature of from 90° C. to about 100° C. We have now found a new process for the production of alkylaminodiborane compounds which permits the use of relatively low temperatures.

Thus, in accordance with the present invention there is provided a novel process for the production of alkylaminodiborane compounds represented by the general formula:

(I)

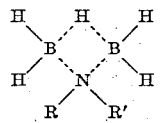

wherein R is an alkyl radical preferably containing up to 8 carbon atoms and wherein R' is a hydrogen atom or an alkyl radical preferably containing up to 8 carbon atoms, which comprises contacting at least one covalent metal borohydride with at least one tetra(alkylamino)diboron compound in an inert, liquid, organic diluent.

As used throughout the specification and claims, the term "tetra(alkylamino)diboron compound" refers to any compound or mixture of compounds represented by the general formula:

(II)

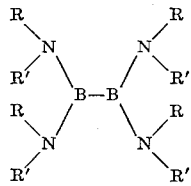

wherein each R and R' is independently selected from the radicals and/or atoms which each represents in connection with Formula I, supra. Although the

groups need not be the same within any given compound, the use of compounds wherein the

groups are not all the same or the use of a mixture of two or more compounds represented by Formula II leads to a mixture of alkylaminodiborane compounds as the product. Thus, when a particular alkylaminodiborane compound is desired, it is preferable to use a substantially pure tetra(alkylamino)diboron compound wherein all

groups are the same as the

group on the desired alkylaminodiborane. It is preferred to use tetra(alkylamino)diboron compounds containing from 4 to about 32 carbon atoms per molecule.

Illustrative of the tetra(alkylamino)diboron compounds which can be used in accordance with the process of this invention are, for example, tetra(dimethylamino)diboron, tetra(diethylamino)diboron, tetra(diisopropylamino)diboron, tetra(di-2-ethylhexylamino)diboron, tetra(di-n-octylamino)diboron, tetra(methylamino)diboron, tetra(ethylamino)diboron, tetra(isopropylamino)diboron, tetra(2-ethylhexylamino)diboron, tetra(n-octylamino)diboron, tri(dimethylamino)-ethylaminodiboron, 1,2-di(diethylamino)-1,2-di(di-n-propylamino)diboron, 1-ethylamino-1-isopropylamino-2-dimethylamino-2-di-n-butylaminodiboron, and the like.

The tetra(alkylamino)diboron compounds used as starting materials can be prepared by methods which are known in the art. For example, the tetra(dialkylamino)diboron compounds can be prepared by reacting diboron tetrachloride with a dialkylamine. Alternatively, they can be prepared by reacting molten sodium which is highly-dispersed in toluene with chloro- or bromo-bis(dialkylamino)borane at about 110° C. The tetra(monoalkylamino)diboron compounds are conveniently prepared by the transamination of a tetra(dialkylamino)diboron compound such as tetra(dimethylamino)diboron. Compounds wherein the

groups vary may, of course, be prepared by employing mixtures of the aminoborane starting materials and/or by partial transamination of a tetra(dialkylamino)diboron compound.

The metal borohydrides which can be employed in the process of this invention are those in which the boron is covalently bonded to a metal atom. The preferred covalent metal borohydrides are aluminum borohydride and beryllium borohydride. Aluminum borohydride is particularly preferred.

The covalent metal borohydrides can be prepared in accordance with known methods. They are prepared in moderate yields by the reaction of either sodium or lithium borohydride with the halide of the metal of the covalent metal borohydride desired as described by Schlesinger et al. in the Journal of the American Chemical Society, 75,209 et seq. (1953).

Extreme caution should be exercised in handling and storing the covalent metal borohydrides. Aluminum borohydride, for example, slowly decomposes with the evolution of hydrogen which can cause high pressures to develop in its container. Moreover, the vapor of aluminum borohydride detonates spontaneously and violently on contact with air containing only traces of moisture.

The inert, liquid, organic diluent can be any organic material which is liquid under the chosen reaction conditions and which is inert with respect to the reactants and products of the reaction. Hydrocarbon diluents such as petroleum ether, mineral oil and other aliphatic hydrocarbons are suitable. Mineral oil is the preferred diluent.

The relative proportions of the metal borohydride and the tetra(alkylamino)boron compound are not narrowly critical. The stoichiometry of the reaction involved is such that two moles of the metal borohydride are consumed per mole of the diboron compound. Consequently, it is desirable to use at least about 2 moles of metal borohydride per mole of the diboron compound. Excellent yields and conversions are obtained by using a molar ratio of metal borohydride to diboron compound of from about 2.2 to about 4. Of course, higher ratios may be used if desired but little advantage is thereby obtained.

The reaction temperature can vary widely depending upon the particular reactants and concentrations employed. Temperatures of from about −10° C. and lower to about −80° C. can be successfully employed although it is preferred to maintain the temperature at about 30° C. or lower until the reactants have been mixed in the solvent. In this manner the exothermic reaction can be more readily controlled. Of course, the exotherm can also be controlled by using a higher proportion of diluent to reactants. With this exception, it appears that the concentration of the reactants in the diluent has no significant effect on the course or the efficiency of the reaction.

The novel process is conveniently carried out by adding the reactants to separate portions of the selected diluent and slowly adding one reactant mixture to the other with stirring. It is preferred to add the tetra(alkylamino) diboron mixture to the metal borohydride mixture at a rate which maintains the reaction temperature below about 30° C. The resulting reaction mixture is then preferably agitated until the completion of the reaction is signalled by the absence of an exotherm. The reaction time will depend upon several factors although, as might be expected, the temperature appears to be the most significant.

The time required for the reaction to go to completion can vary from several minutes to several days although the reaction will usually be completed in from about 2 to about 20 hours. Of course, it is not essential that the reaction be allowed to go to completion and appreciable amounts of product can be recovered in substantially less time. Best results are obtained when vigorous agitation is provided to insure adequate contact between the reactants.

The alkylaminodiborane product can be recovered by methods which are well known. The preferred technique will obviously depend upon the properties of the particular alkylaminodiborane product and the diluent medium employed. In general, however, vacuum distillation or distillation under a nitrogen atmosphere are suitable methods of recovery.

The following examples illustrate the process of this invention.

EXAMPLES (A) A 25 milliliter portion of dry mineral oil was charged to a 150 milliliter round bottom flask which was equipped with a magnetic stirring bar and a valved side arm attached to a high vacuum system. Seventy millimoles of aluminum borohydride were added to the mineral oil. A mixture of 28.8 millimoles of tetra(dimethylamino)diboron in 20 milliliters of dry mineral oil was then added to the aluminum borohydride-mineral oil solution over a 2-hour period during which the temperature in the reaction flask was not allowed to exceed 30° C. The mixture was thereafter vigorously stirred at 23° C. for about 17 hours. The vapors in the flask at 25° C. were then distilled from the flask and collected in a trap at −196° C. The mixture of liquids and solids so collected was then fractioned through traps held at −80° C., −112° C. and 196° C. The infrared spectrum of the fraction collected at −112° C. identified the product as dimethylaminodiborane which was contaminated with a small amount of aluminum borohydride. The thus contaminated product was purified by mixing it with about ½ milliliter of n-butylether and stirring the mixture at 25° C. for about 5 minutes after which pure dimethylaminodiborane was distilled from the ether at 0° C. The dimethylaminodiborane, which was identified by its vapor pressure at 0° C. (101 mm. Hg) and its infrared spectrum, was obtained in a 59 percent yield.

(B) In like manner diethylaminodiborane and butylaminodiborane are obtained by reacting beryllium borohydride with tetra(diethylamino)diboron and tetra(butylamino)diboron, respectively.

What is claimed is:

1. A process for the production of alkylaminodiborane compounds which comprises contacting at least one covalent metal borohydride selected from the group consisting of aluminum borohydride and beryllium borohydride with at least one tetra(alkylamino)diboron compound having the formula:

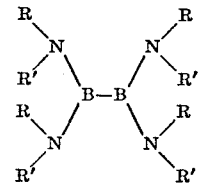

wherein each R is alkyl containing up to 8 carbon atoms, each R' is of the group consisting of hydrogen and alkyl containing up to 8 carbon atoms, in an inert, liquid, organic diluent at a reaction temperature of from about −10° C. to about 80° C.

2. A process as claimed in claim 1 in which the tetra(alkylamino)diboron compound contains from 4 to about 32 carbon atoms.

3. A process as claimed in claim 1 in which all

groups on the tetra(alkylamino)diboron compound are the same and the tetra(alkylamino)diboron compound contains from 4 to about 32 carbon atoms.

4. A process as claimed in claim 1 in which the tetra-(alkylamino)diboron compound is tetra(dimethylamino)diboron.

5. A process as claimed in claim 3 in which the covalent metal borohydride is aluminum borohydride.

6. A process as claimed in claim 5 in which the inert, liquid, organic diluent is an aliphatic hydrocarbon diluent.

7. A process as claimed in claim 6 in which the aliphatic hydrocarbon diluent is mineral oil.

8. A process as claimed in claim 1 which comprises contacting tetra(dimethylamino)diboron with at least 2 moles, per mole of tetra(dimethylamino)diboron, of aluminum borohydride in mineral oil.

References Cited

Burg and Randolph: J. Amer. Chem. Soc., 71, 3451 (1949).

Noth and Beyer: Chem. Ber., 93 928 (1960).

Schaeffer and Anderson: J. Amer. Chem. Soc., 71, 3451 (1949).

HENRY R. JILES, *Primary Examiner.*

WALTER A. MODANCE, *Examiner.*

H. I. MOATZ, *Assistant Examiner.*